US006826774B1

(12) United States Patent
Holme

(10) Patent No.: US 6,826,774 B1
(45) Date of Patent: Nov. 30, 2004

(54) GEOMETRICALLY SEGMENTED PROGRAM GUIDE

(75) Inventor: Richard Holme, Leeds (GB)

(73) Assignee: Pace Micro Technology PLC, Shipley (GB)

( * ) Notice: Subject to any disclaimer, the term of this patent is extended or adjusted under 35 U.S.C. 154(b) by 0 days.

(21) Appl. No.: 09/524,490

(22) Filed: Mar. 13, 2000

(30) Foreign Application Priority Data

Mar. 16, 1999 (GB) .............................................. 9905968

(51) Int. Cl.[7] .......................... G06F 3/00; G06F 13/00; H04N 5/445
(52) U.S. Cl. ........................................ 725/39; 345/719
(58) Field of Search ........................... 725/37, 38, 39, 725/44; 345/719

(56) References Cited

U.S. PATENT DOCUMENTS

| 5,442,741 | A |   | 8/1995  | Hughes et al. |        |
|-----------|---|---|---------|---------------|--------|
| 5,491,779 | A |   | 2/1996  | Bezjian       |        |
| 5,557,724 | A | * | 9/1996  | Sampat et al. | 725/43 |
| 5,767,919 | A |   | 6/1998  | Lee et al.    |        |
| 5,933,141 | A | * | 8/1999  | Smith         | 725/39 |
| 6,230,323 | B1| * | 5/2001  | Hama et al.   | 725/39 |
| 6,323,911 | B1| * | 11/2001 | Schein et al. | 725/56 |
| 6,411,337 | B2| * | 6/2002  | Cove et al.   | 348/563|
| 6,481,011 | B1| * | 11/2002 | Lemmons       | 725/47 |
| 6,496,981 | B1| * | 12/2002 | Wistendahl et al. | 725/61 |
| 6,593,942 | B1| * | 7/2003  | Bushmitch et al.  | 345/721 |

FOREIGN PATENT DOCUMENTS

| EP | 854645 A2 |   | 7/1998 | .......... H04N/5/445 |
| KR | 2001039205 A | * | 5/2001 | .......... H04N/5/445 |
| WO | WO99/03270 |   | 1/1999 | .......... H04N/5/445 |

* cited by examiner

*Primary Examiner*—John Miller
*Assistant Examiner*—Scott Beliveau
(74) *Attorney, Agent, or Firm*—Head, Johnson & Kachigian

(57) ABSTRACT

A display is generated for viewing on a display screen. The display indicates any or any combination of a function of the display screen control parameters and/or information relating to channels and/or programmes which can be viewed on the screen. The display further comprises one or more geometrical shapes, each split into a plurality of segments and the segments represent particular time intervals, programme/channel information, control parameter information or the like.

11 Claims, 3 Drawing Sheets

GEOMETRICALLY SEGMENTED PROGRAM GUIDE

CROSS-REFERENCE TO RELATED APPLICATIONS

This application claims priority to GB Application No. 9905968.5 filed Mar. 16, 1999.

BACKGROUND OF THE INVENTION

The invention which is the subject of this application relates to a format for the display on a television or monitor screen to represent information to the user of the screen relating to material which is to be displayed on the said screen. In particular, but not necessarily exclusively, the invention relates to the generation of a display for use as part of an electronic programs guide to the user which indicates to the user the various options of programs which can be watched at that time and/or in the future on the various channels and/or broadcast services available to the user.

The provision of electronic program guide (EPG) information to a user of a display screen linked to broadcast data receiving apparatus is well known. The data for the EPG is typically generated from data which is broadcast from a remote location and relates to the various channels and programs which are available or selection by the user of the apparatus. The data for the EPG is broadcast and transmitted along with the video, audio and/or text data to broadcast data receiving apparatus located in premises and which apparatus is connected to displays. The data transmission can be by satellite, cable or terrestrial network systems.

As the proliferation of available channels and programs which can be selected increases so there is a need to display this information to the user but, as the number of channels and programs which are available to the user increase so it becomes increasingly difficult to either show information for a relatively large time interval and/or show all of the program channels on the screen at any one time.

SUMMARY OF THE INVENTION

The aim of the present invention is to provide for the generation of and a display to a user which represents in an easily distinguishable and interpretable manner, information relating to programs which can be viewed at that time or in the future. It is a further aim of the invention to provide a display which can be generated to display functions other than programs such as for example volume settings, contrast or brightness settings on the functions of the television set and/or signal receiver.

In a first aspect of the invention there is provided a process for generating a display for viewing on a display screen, said display generated by broadcast data receiving apparatus provided in connection with the display screen and said display including information generated from any, or any combination of data held in the memory of the apparatus and/or data broadcast to the apparatus from a remote location, and indicating program information relating to a program channel and characterised in that said display includes a geometrical shape split into a plurality of segments.

The invention therefore provides a display which is generated for viewing on a display screen by broadcast data receiving apparatus, said display indicating any or any combination of a function of the display screen control parameters and/or information relating to channels and/or programs which can be viewed on the screen and wherein said display comprises a geometrical shape split into a plurality of segments.

Typically the segments converge at a common point on the display and diverge outwardly therefrom.

In one embodiment each geometrical shape represents a particular time interval on one program channel and the segments of said geometrical shape are selected to represent program which occur on that channel during the particular time interval. The size of the segment indicates the length of the particular program and hence each of the programs in that time interval so that the user has an immediate indication of the programs available to watch on the channel represented by the geometrical shape and over the time represented by the geometrical shape.

In one embodiment, a plurality of geometrical shapes can be generated either at the same time on the display screen to represent the program available to watch on some or all of the available channels on the same screen or alternatively, individual geometrical shapes can be provided in sequence for display to the user and controlled by the user using display control means such as a conventional remote control device so that the same can be "flicked through" by the user.

In one embodiment, the segments can be colored or provided of differing colors or patterns to distinguish the same. In one embodiment the segments can be color coded so as to further indicate to the user, who can access the key to the coding, the subject matter of the programs in question so that certain areas of interest such as nature, sport etc, can be represented by specified colors and the data which allows the appropriate colors or patterns to be input is broadcast along with the program data to the broadcast data receiving apparatus which then separates the data and generates the appropriate segment color or pattern.

It is envisaged that in a typical embodiment the broadcast data receiving apparatus will have in memory data which controls the generation of the shape and the generation of segments of the shape. However the actual configuration of the segments within the shape is determined by data received from the broadcaster. This data can include program start and end times, locates the program data on a particular channel, can include information relating to the program subject matter and so on. When this data is received and the user selects to vies the program information the geometrical shape is generated and the positioning of the segments determined with respect to the received data and the program which can be viewed on the channel represented by the shape and over the time interval represented.

In a yet further embodiment of the invention, as time progresses there can be progressive shading, movement of the display or portions of the display, or otherwise altering the geometrical shape of the display to indicate the passage of time through the time interval displayed on the geometrical shape if the geometrical shape is indicating presently available programs.

In a further aspect of the invention there is provided a process for generating a display for viewing on a display screen, said display generated by broadcast data receiving apparatus provided in connection with the display screen and said display including information generated from data relating to the display screen and broadcast data receiving apparatus and representing a function of operation of the display screen or broadcast data receiving apparatus and characterized in that said display includes a geometrical shape split into a plurality of segments.

In one embodiment the shape represents a range of volume and a change in appearance of the shape or segments indicates the volume level selected.

Typically a plurality of geometric shapes, in combination, represent the range of volume.

Thus, in this embodiment, the geometrical shape can still be split into a series of segments and indications which can be representative of a function or functions of the operation of the display are provided such as the display of a television set, such that for example the geometric shapes may indicate the range of volume which is possible by a series of segments and the selection of a particular volume level is indicated by a change in appearance of segments from zero to the particular volume level selected.

In either embodiment it is envisioned that the geometric shape best suited would be a circle but the invention can equally be applied in triangles, squares, rectangles, hexagonal shapes, ellipses, semi-circles.

BRIEF DESCRIPTION OF THE DRAWINGS

Specific embodiments of the invention will now be described with reference to the accompanying drawings, wherein:

FIGS. 4A to 4G illustrate a further aspect of the invention in relation to television and/or set top box control displays.

DETAILED DESCRIPTION OF THE PREFERRED EMBODIMENTS

Figure 1:
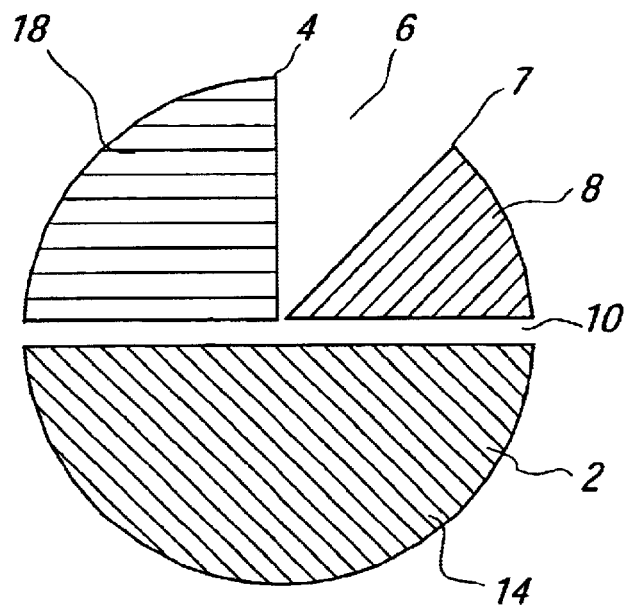
FIG. 1 illustrates a first embodiment of the invention.
Figure 5:
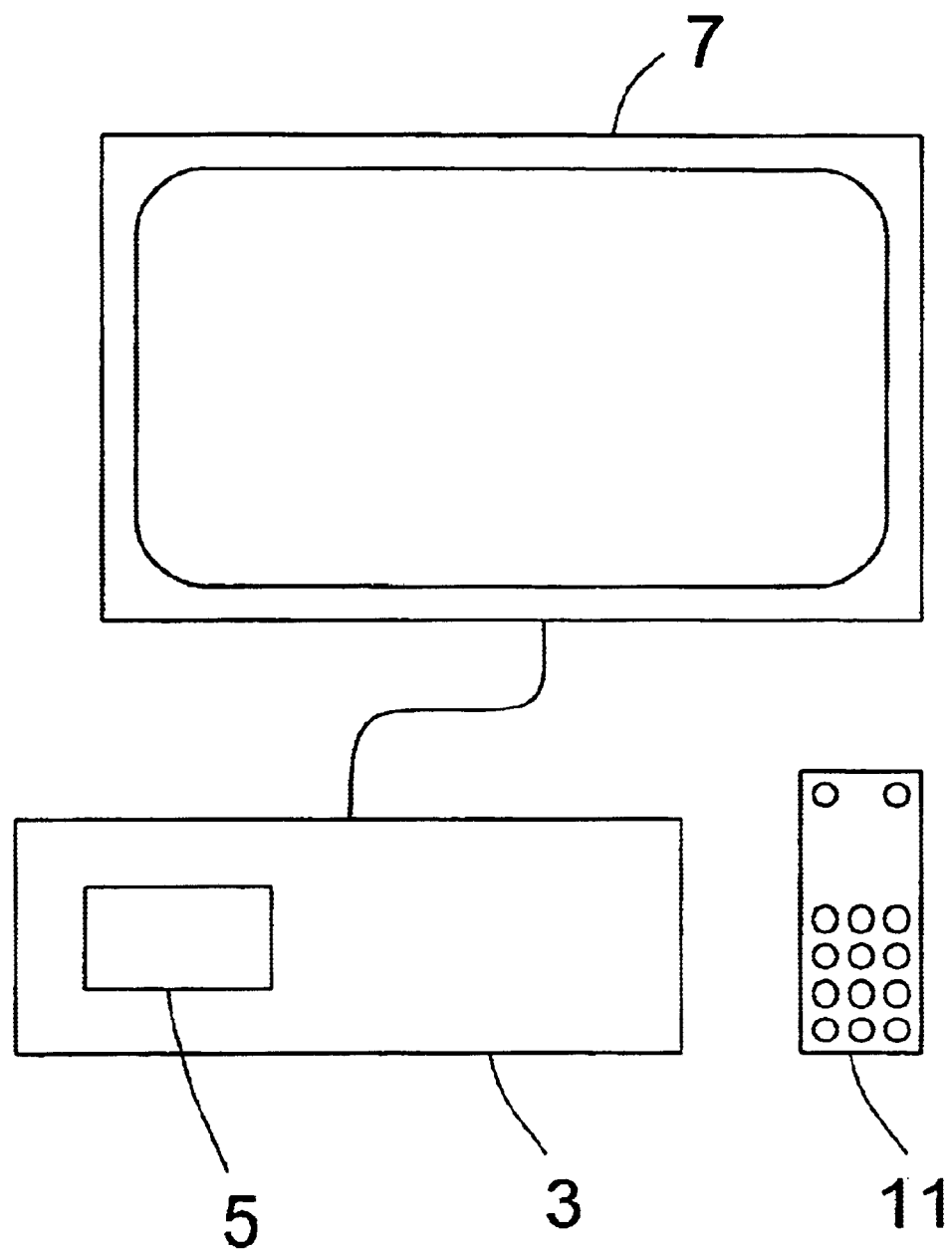
FIG. 5 illustrates a simplified schematic diagram of an embodiment of the invention

Referring firstly to FIG. 5 there is illustrated a broadcast data receiving apparatus 3 having a memory 5 for generating a display being connected with a display screen 7. A display control means is indicated by reference numeral 11. Referring now to FIG. 1, there is illustrated a display in accordance with the invention for indicating to a user the current status and programs available to view over a period of time and, in the case of FIG. 1, on one particular channel. Thus, in the FIG. 1, there is illustrated a display 2 for generation on a television screen or monitor screen. The display is circular and is split into a series of segments. In this case, the display represents 60 minutes through 360° with the vertical line 4 indicating the start and finish of the 60 minutes. The first segment 6 is left blank but may alternatively be shaded in a distinctive manner to indicate via the line 7 to the user the time at which they are actually viewing the display with respect to the start of the hour. Thus, the line 7 progresses around the circle and the size of the segment 6 increases as time progresses during the hour. The segment 8 represents to the user the remaining time of program 1 which will finish as indicated by the line 10, and therefore the user will be aware that they have missed the start of program 1 but still have a period of time of just less than half of the program to view. The segment 14 indicates the duration of program 2 and the following segment 18 the duration of program 3 and so it will be appreciated that FIG. 1 illustrates a simple, clearly distinguishable and descriptive display to the user with respect to the three programs which can be viewed within the hour during which the user is looking at the display.

Figure 2:
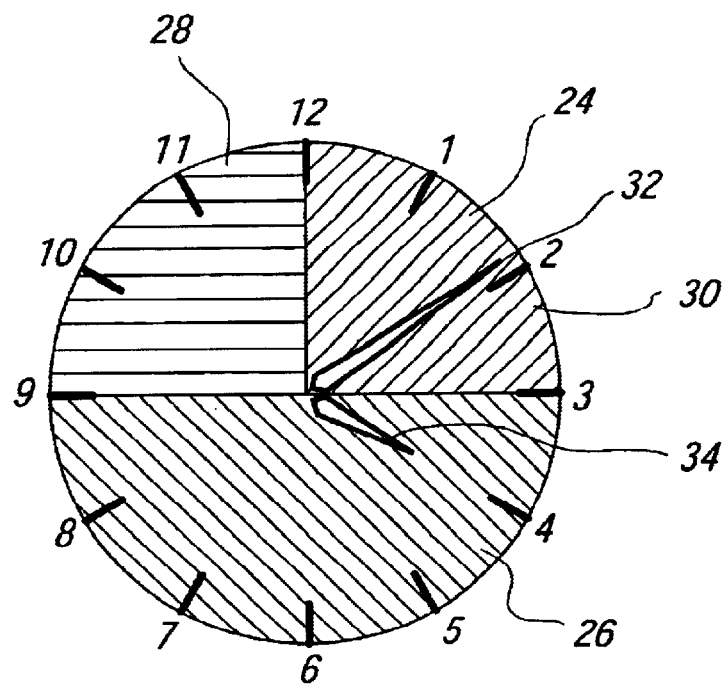
FIG. 2 illustrates a further embodiment of the invention.

FIG. 2 illustrates an alternative embodiment wherein the display is again circular in form and again comprises a series of segments 24, 26, 28, each of which represents programs 1, 2 and 3 as with FIG. 1. In this case however there is superimposed a clock face 30 with hands 32, 34. It will therefore be appreciated that if the display of FIG. 2 is to represent an hour as with FIG. 1, then the hand 32 illustrates the same time of viewing as does the line 7 in FIG. 1. However, as an alternative, the display of FIG. 2 can be used to represent a 12-hour period of time and so will include a significantly increased number of segments with both the hands 32 and 34 indicating to the user the particular time of viewing and allowing the user to cross-reference the time with the program sectors to allow them to decide what and when to watch.

In one embodiment a series of said geometrical shapes can be generated for different channels so that these can be scrolled through on the display screen using conventional scrolling means or alternatively, a series of the displays can be presented on one screen display for viewing.

Figure 3:
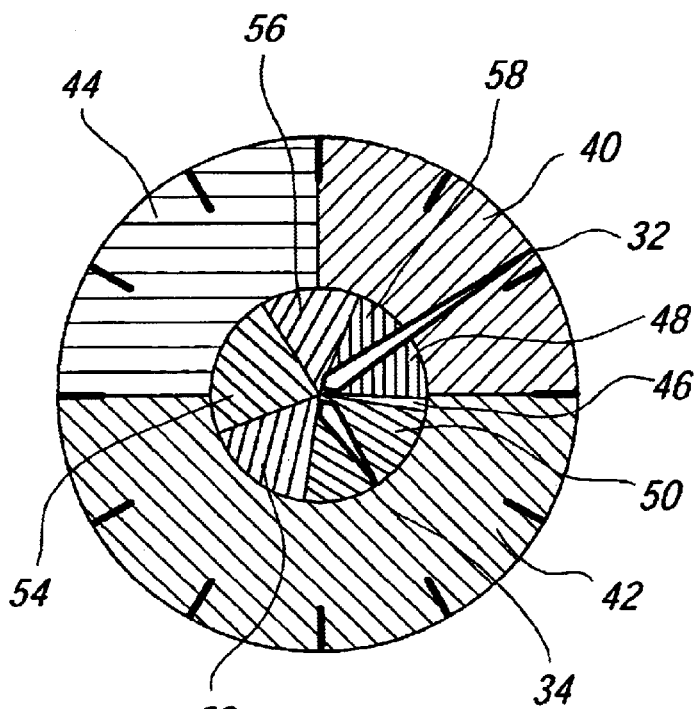
FIG. 3 illustrates a yet further embodiment of the invention.
Figure 4A:
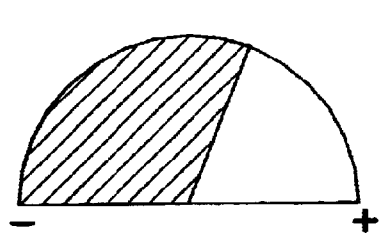
Figure 4B:
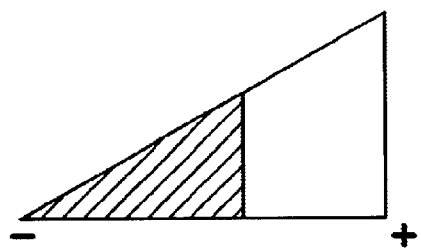
Figure 4C:
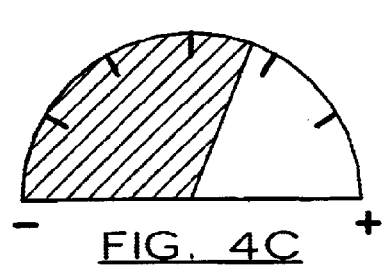
Figure 4D:
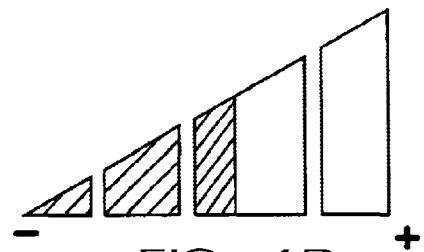

FIG. 3 illustrates a yet further embodiment which is broadly in line with the features of FIG. 2 in that at the outer edge, programs 1, 2 and 3 are indicated by the sectors 40, 42 and 44. Furthermore the hands 32, 34 are used in a similar manner to that described in FIG. 2 and reference to FIG. 2 describes the operation of the outer sector of FIG. 3. However, there is also shown an inner sector 46 which also comprises a series of segments 48, 50, 52, 54 56 and 58 and these inner segments represent a 12-hour period of time so that in one display for one channel, there is provided a 1-hour display on the outer sector of segments and a 12-hour display on the inner sector with the large hand 32 being relevant to the outer sector time and the inner hand 34 being relevant to the inner sector time, thereby providing to the user an immediate indication of program which are immediately available to watch or will be available within the next hour and also allow them to plan their viewing schedule for the next 12 hours.

FIGS. 4A to 4D illustrate a further aspect of the invention wherein geometrical displays are used to indicate the particular level of controls of a television set or broadcast data receiver or monitor so that for example any, or any combination of the displays shown in FIGS. 4A to 4D can be used to represent any or any combination of the level of volume, brightness, contrast or color of the television monitor display to the user and in this embodiment the data used to generate the display is obtained from memory of the display screen, such as that of a television set and/or the broadcast data receiver. This differs from the embodiment where the generation of geometrical shapes is undertaken to indicate program information as this is typically generated wholly from data received by the broadcast data receiver from a remote location, or in combination with data held in memory, as the display is generated to show real time or future time information to the user and requires to received updates on this information on an ongoing basis which is transmitted to the receiver apparatus which decodes, identifies and processes the relevant digital data and, from this received data, the size and representation of the segments of the shapes can be generated at each time the user request the generation of the program information display.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element

What is claimed is:

1. A process for generating a display, generated by a broadcast data receiving apparatus having a memory and provided in connection with the display, for viewing on a display screen, the display including information generated from any, or any combination of data held in the memory of the broadcast data receiving apparatus and/or data broadcast to the receiving apparatus from a remote location, and indicating program information relating to a program channel, said process for generating a display comprising the following:

at least one geometrical shape representing a particular time interval of a specific program channel which can be selected by a user to be viewed via the display screen, said at least one geometrical shape including, providing a plurality of segments, each segment representing a program broadcast on a program channel, the size of each segment, with respect to the geometrical shape and the time interval represented by the geometrical shape, indicates the length of time of the program represented by each segment, and a center point wherein each of the segments in at least one geometrical shape converse toward and diverse outwardly therefrom to the periphery of the geometrical shape.

2. A process for generating a display according to claim 1 wherein a plurality of geometrical shapes are generated on the display screen, each shape representing a user selectable channel.

3. A process for generating a display according to claim 1 wherein a plurality of geometrical shapes are generated in succession to allow a user to view the geometrical shapes in sequence on the display screen using a display control means.

4. A process for generating a display according to claim 1 wherein said segments are colored and/or patterned to visually distinguish adjacent segments.

5. A process for generating a display according to claim 1 wherein said segments are color coded to indicate to the user, who has access to a key to the color coding, the subject matter of the programs represented by the respective said segments.

6. A process for generating a display according to claim 1 wherein as time progresses, there is progressive shading of said at least one geometrical shape and said segments to indicate those programs which have been shown and those which are to be displayed in the future.

7. A process for generating a display according to claim 1 wherein as time progresses the shape of said at least one geometrical shape or said segments of said shape change to indicate a time change.

8. A display according to claim 1 wherein said at least one geometric shape is selected from the group consisting of: circles, triangles, and hexagons.

9. A display according to claim 1 wherein said at least one geometrical shape is a circle with numbers at spaced intervals representing hours to depict a clock face with hands, said hands representing the progression of time with respect to programs represented by said segments of said at least one geometrical shape.

10. A process for generating a display according to claim 1 wherein said segments are patterned to visually distinguish adjacent segments.

11. A process for generating a display for viewing on a display screen, the display generated by broadcast data receiving apparatus provided in connection with the display screen and the display including information generated from any, or any combination of data held in the memory of the apparatus and/or data broadcast to the apparatus from a remote location, and indicating program information relating to a program channel, said process comprising:

providing a display including a geometrical shape split into a plurality of segments and wherein the geometrical shape is a circle with numbers at spaced intervals representing hours to depict a clock face with hands, said hands representing the progression of time with respect to programs represented by said segments of the shape.

\* \* \* \* \*